United States Patent
Fujimoto et al.

(10) Patent No.: US 8,132,635 B2
(45) Date of Patent: Mar. 13, 2012

(54) MOTOR LOCK PREVENTION CONTROL FOR HYBRID ELECTRIC VEHICLE

(75) Inventors: Satoru Fujimoto, Kawasaki (JP); Kazutaka Adachi, Yokohama (JP); Hiroyuki Ashizawa, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 601 days.

(21) Appl. No.: 11/772,916

(22) Filed: Jul. 3, 2007

(65) Prior Publication Data
US 2008/0006457 A1    Jan. 10, 2008

(30) Foreign Application Priority Data
Jul. 5, 2006    (JP) .................. 2006-185565

(51) Int. Cl.
*B60W 20/00*    (2006.01)
*B60K 6/20*    (2007.10)

(52) U.S. Cl. ............ 180/65.285; 180/65.21; 180/65.275

(58) Field of Classification Search ............... 180/65.21, 180/65.22, 65.25, 65.275, 65.285, 65.265; 903/946
See application file for complete search history.

(56) References Cited

U.S. PATENT DOCUMENTS

| | | | |
|---|---|---|---|
| 5,934,398 A | 8/1999 | Hotta | |
| 6,758,788 B2 * | 7/2004 | Itou | 477/8 |
| 6,808,470 B2 * | 10/2004 | Boll | 477/6 |
| 7,244,208 B2 | 7/2007 | Bauknecht et al. | |
| 7,351,182 B2 * | 4/2008 | Kobayashi | 477/5 |
| 2004/0065490 A1 * | 4/2004 | Saito et al. | 180/65.1 |
| 2004/0152558 A1 * | 8/2004 | Takami et al. | 477/3 |
| 2005/0079942 A1 | 4/2005 | Bauknecht et al. | |
| 2005/0155803 A1 | 7/2005 | Schiele | |
| 2007/0221421 A1 | 9/2007 | Tanishima | |

FOREIGN PATENT DOCUMENTS

| | | |
|---|---|---|
| DE | 10302172 A1 * | 7/2004 |
| JP | 7-215225 (A) | 8/1995 |
| JP | 9-56182 (A) | 2/1997 |
| JP | 11-82260 A | 3/1999 |
| JP | 2001263383 A * | 9/2001 |
| JP | 2003-41966 A | 2/2003 |
| JP | 2005-112351 A | 4/2005 |
| JP | 2005-117779 (A) | 4/2005 |
| JP | 2005-221073 A | 8/2005 |
| JP | 2006-117206 (A) | 5/2006 |

OTHER PUBLICATIONS

Description of Skyline New Model Car: CV35, Nissan Motor Co., Ltd., Jan. 2003, 16 pgs.
Service Manual of Infiniti G35 Model V35 Series, "A/T Control System", Nissan Motor Co., Ltd., Jul. 2005, Publ.No. SM5E-!V35U4, 12 pgs.

* cited by examiner

*Primary Examiner* — J. Allen Shriver, II
*Assistant Examiner* — James M Dolak
(74) *Attorney, Agent, or Firm* — Foley & Lardner LLP

(57) ABSTRACT

There is provided a motor lock prevention control device for a hybrid vehicle that has a motor-generator and a clutch capable of changing a transmission torque capacity between the motor-generator and driving wheels. The motor lock prevention control device is configured to, when the motor-generator is in a motor locked state to cause heat generation under drive load operating condition, perform motor prevention control to induce rotation of the motor-generator by adjusting at least one of the transmission torque capacity of the clutch and torque of the motor-generator in such a manner that the torque of the motor-generator exceeds the transmission torque capacity of the clutch.

7 Claims, 7 Drawing Sheets

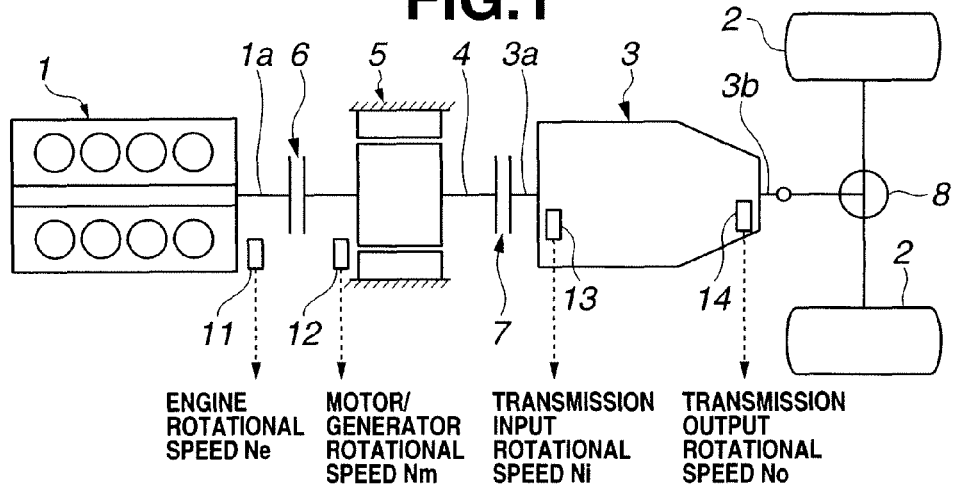
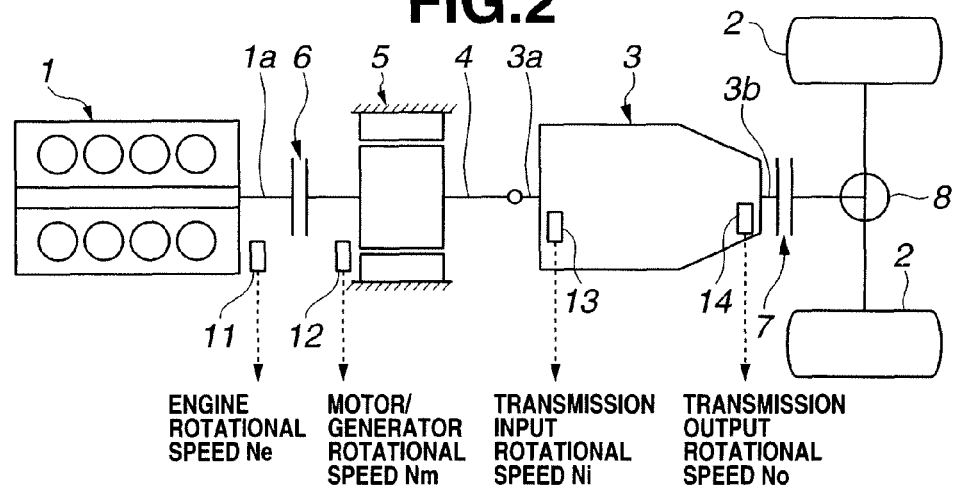
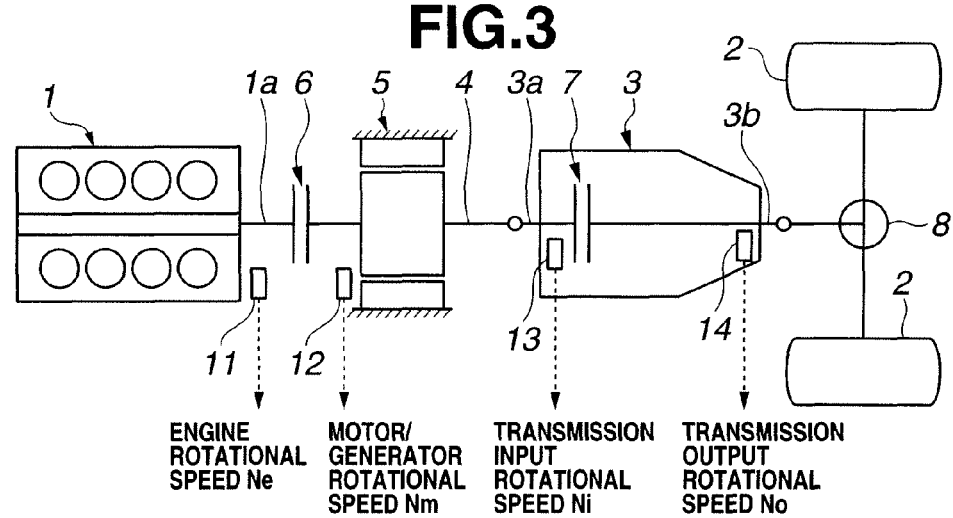

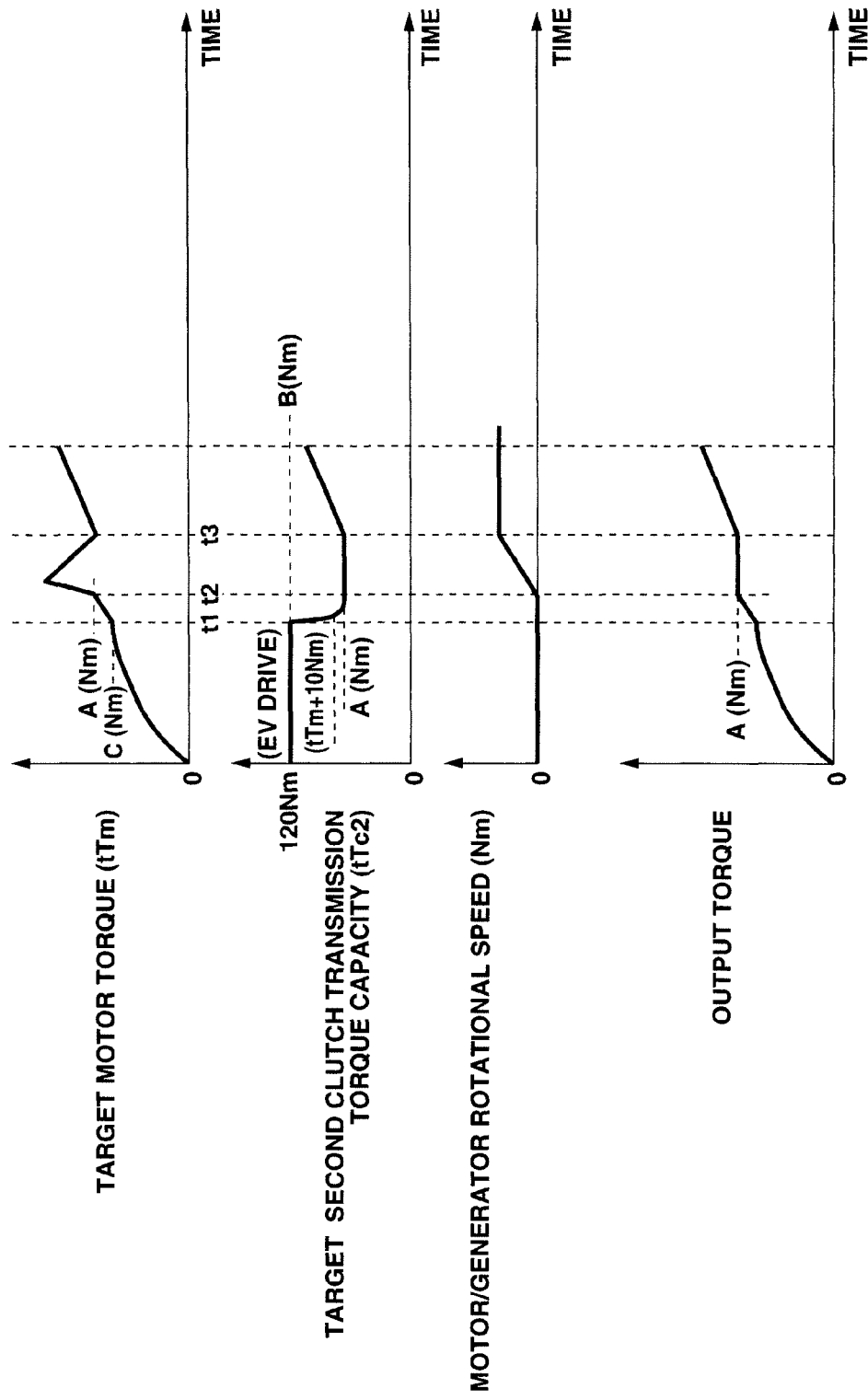

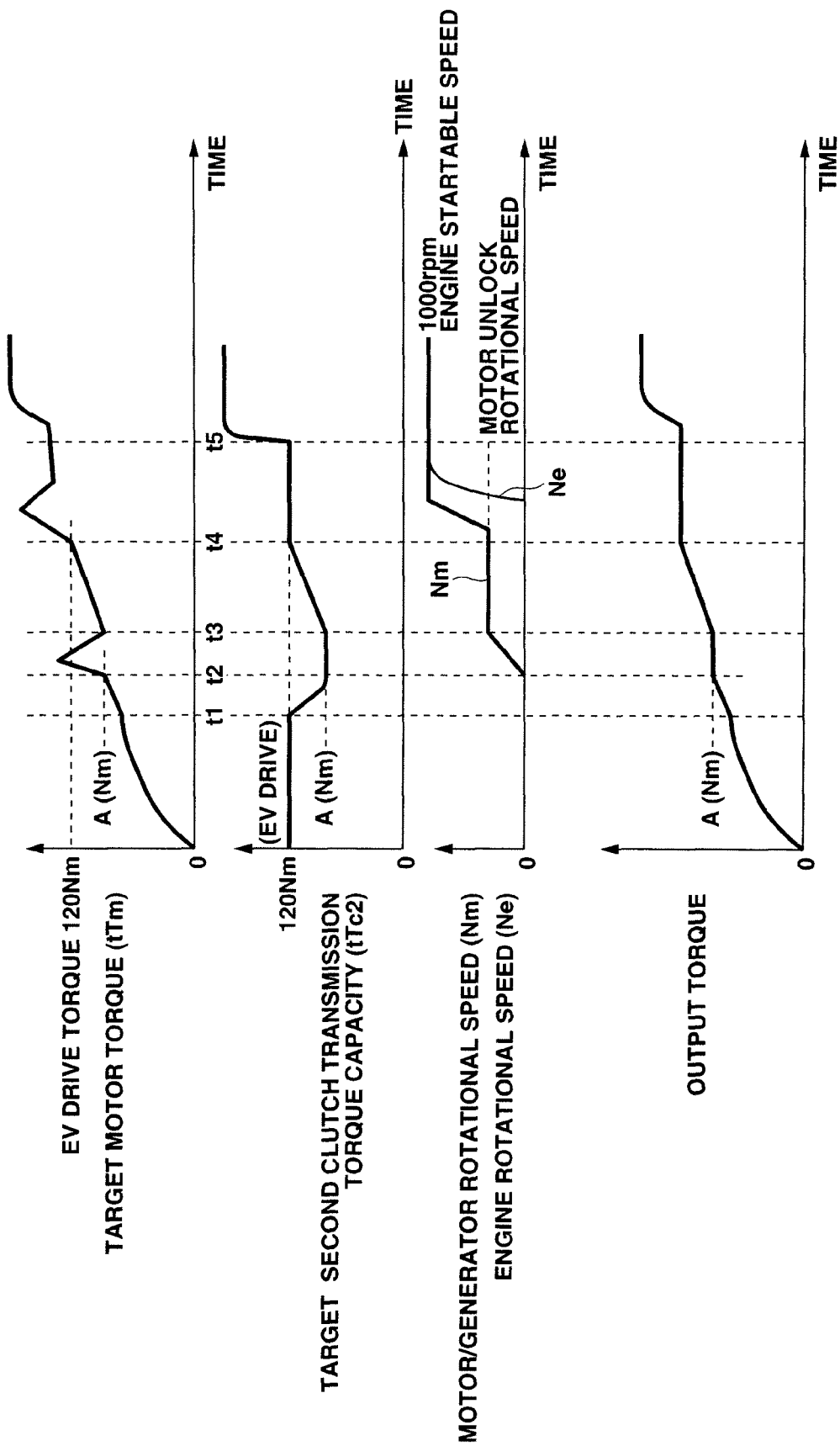

MOTOR LOCK PREVENTION CONTROL FOR HYBRID ELECTRIC VEHICLE

BACKGROUND OF THE INVENTION

The present invention relates to a hybrid vehicle having an engine and a motor-generator as a driving power source and, more particularly, to a device and method for preventing the motor-generator from being locked even under load operating conditions.

Various drive systems have been proposed for hybrid vehicles, which generally combine engines with motor-generators as driving power sources and switch between an electric drive (EV) mode in which the hybrid vehicles are powered only by the motor-generators and a hybrid drive (HEV) mode in which the hybrid vehicles are powered by both the engines and the motor-generators. Japanese Laid-Open Patent Publication No. 11-082260 discloses one such type of hybrid drive system that includes an engine, a transmission, a motor-generator with an energization control circuit (inverter), a first clutch disposed between the engine and the motor-generator and a second clutch disposed between the motor-generator and the transmission, so as to establish the EV mode by disengagement of the first clutch and by engagement of the second clutch and to establish the HEV mode by engagement of the first and second clutches. This hybrid drive system presents a possibility that the motor-generator gets overloaded and becomes unable to rotate properly even under load operating conditions, for example, when the hybrid vehicle makes a sudden uphill start in the EV mode. In such a motor locked state, the motor-generator energization control circuit sets up continuous energization only in its specific phase and causes a temperature increase of the motor-generator by heat generation. The hybrid vehicle becomes more incapable of proper start as the output torque of the motor-generator decreases with such a temperature increase.

SUMMARY OF THE INVENTION

Japanese Laid-Open Patent Publication No. 2003-041966 proposes, as a motor lock prevention technique, a hybrid drive system provided with an engine and two separate motors: a first motor for driving the hybrid vehicle in the EV mode and a second motor for starting the engine so that, if the first motor is estimated to be locked under load operating conditions, the second motor is actuated immediately to start the engine and thereby complement a lack of motor torque with engine torque. However, the proposed motor lock prevention technique cannot be applied unless the hybrid vehicle has two separately operable motors.

It is therefore an object of the present invention to provide a motor lock prevention device and method for a hybrid electric vehicle in which a single common motor-generator is mounted to enable electric vehicle driving.

According to a first aspect of the present invention, there is provided a motor lock prevention control device for a hybrid vehicle, the hybrid vehicle having an engine and a motor-generator as a driving power source, a first clutch capable of changing a transmission torque capacity between the engine and the motor-generator and a second clutch capable of changing a transmission torque capacity between the motor-generator and driving wheels so as to establish an electric drive mode in which the vehicle is powered by the motor-generator, with the engine stopped, upon disengagement of the first clutch and engagement of the second clutch and to establish a hybrid drive mode in which the vehicle is powered by the engine and the motor-generator upon engagement of the first and second clutches, the motor lock prevention control device being configured to: judge whether the motor-generator is being energized in such a manner as to cause heat generation in a motor locked state under a drive load operating condition; when the motor-generator is judged as being energized in such a manner as to cause heat generation in the motor locked state under the drive load operating condition, perform motor lock prevention control to induce rotation of the motor-generator by adjusting at least one of the transmission torque capacity of the second clutch and torque of the motor-generator such that the torque of the motor-generator exceeds the transmission torque capacity of the second clutch; and after inducing said rotation of the motor-generator, increase a rotational speed of the motor-generator to a level corresponding to a motor unlocked state of the motor-generator.

According to a second aspect of the present invention, there is provided a motor lock prevention control device for a hybrid electric an vehicle, the hybrid electric vehicle having a motor-generator and a transmission equipped with a start clutch capable of changing a transmission torque capacity between the motor-generator and driving wheels, the motor lock prevention control device being configured to: judge whether the motor-generator is being energized in such a manner as to cause heat generation in a motor locked state under a drive load operating condition; when the motor-generator is judged as being energized in such a manner as to cause heat generation in the motor locked state under the drive load operating condition, perform motor lock prevention control to induce rotation of the motor-generator by adjusting at least one of the transmission torque capacity of the start clutch and torque of the motor-generator such that the torque of the motor-generator exceeds the transmission torque capacity of the start clutch; and after inducing said rotation of the motor-generator, increase a rotational speed of the motor-generator to a level corresponding to a motor unlocked state of the motor-generator.

According to a third aspect of the present invention, there is provided a motor lock prevention control method for a hybrid electric vehicle, the hybrid electric vehicle having a motor-generator and a clutch capable of changing a transmission torque capacity between the motor-generator and driving wheels, the motor lock prevention control method comprising: judging whether the motor-generator is being energized in such a manner as to cause heat generation in a motor locked state under a drive load operating condition; when the motor-generator is judged as being energized in such a manner as to cause heat generation even in the motor locked state under the drive load operating condition, performing motor lock prevention control to induce rotation of the motor-generator by adjusting at least one of the transmission torque capacity of the clutch and torque of the motor-generator such that the torque of the motor-generator exceeds the transmission torque capacity of the clutch; and after inducing said rotation of the motor-generator, increasing a rotational speed of the motor-generator to a level corresponding to a motor unlocked state of the motor-generator.

The other objects and features of the present invention will also become understood from the following description.

BRIEF DESCRIPTIONS OF THE DRAWINGS

FIGS. 1 to 3 are schematic plane views of power trains applicable to a hybrid vehicle according to one embodiment of the present invention.

FIG. 8 is a time chart showing another example of motor lock prevention control during the execution of the motor lock prevention control program.

FIG. 9 is a time chart showing still another example of motor lock prevention control during the execution of the motor lock prevention program.

DESCRIPTIONS OF THE EMBODIMENTS

Figure 4:
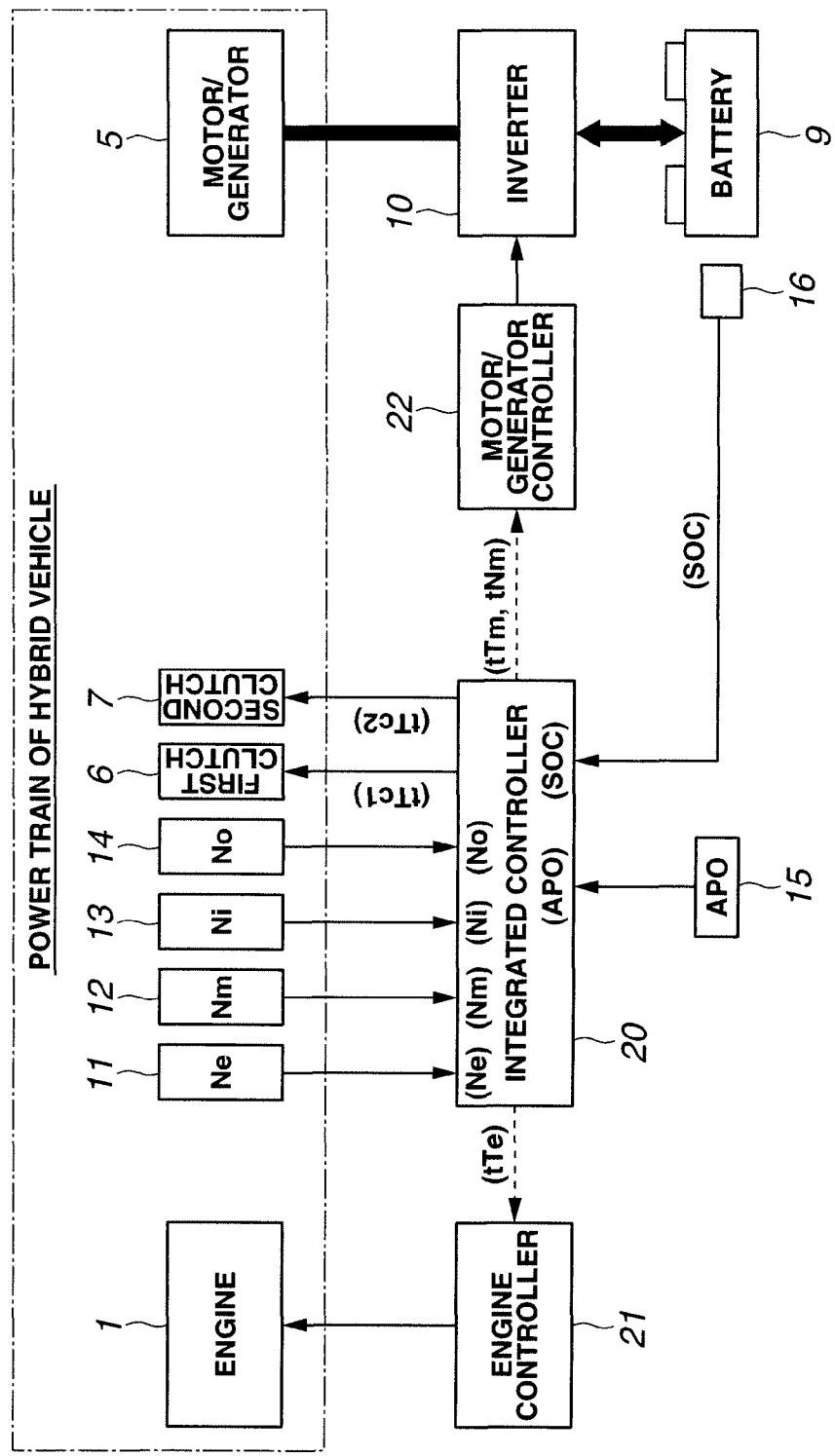
FIG. 4 is a block diagram of a power train control apparatus of the hybrid vehicle according to one embodiment of the present invention.

A hybrid electric vehicle according to an exemplary embodiment of the present invention will be described below in detail with reference to the drawings in which like parts and portions are designated by like reference numerals. It should be noted that, throughout the following description, the terms "front" and "rear" refer to the relative positions of components with respect to the front and rear of the vehicle.

In the present embodiment, the hybrid vehicle is designed as a front-engine, rear-wheel-drive vehicle to which various power trains are applicable.

For example, the hybrid vehicle employs a power train that includes engine 1 and motor-generator 5 as a driving power source, automatic transmission 3, transmission shaft 4, first clutch 6, second clutch 7 and differential gear unit 8 as shown in FIG. 1.

Automatic transmission 3 is mounted in tandem arrangement on the rear side of engine 1 and has input shaft 3a connected to crankshaft 1a of engine 1 via transmission shaft 4 and output shaft 3b connected to rear wheels (driving wheels) 2 via differential gear unit 8. There is no particular restriction on the type of automatic transmission 3. Automatic transmission 3 can be either a multi-speed transmission or a continuously variable transmission. One type of multi-speed transmission is exemplified in "Description of Skyline New Model Car: CV35, Pages C-9 to C22 (issued by Nissan Motor Co., Ltd., in January, 2003)". The multi-speed transmission generally includes a plurality of transmission friction elements such as clutches and brakes to determine a transmission path (select a gear) by selective engagement and disengagement of these friction elements. Namely, automatic transmission 3 changes rotation of input shaft 3a at a gear ratio in accordance with the selected gear and outputs the resulting rotation to output shaft 3b so that the output rotation is distributed to left and right rear wheels 2 by differential gear unit 8.

Motor-generator 5 serves as a motor and a generator and is coupled to transmission shaft 4 at a location between engine 1 and automatic transmission 3.

First clutch 6 is disposed between engine 1 and motor-generator 5 (more specifically, between engine crankshaft 1a and transmission shaft 4) and selectively engaged and disengaged to change a transmission torque capacity between engine 1 and motor-generator 5 continuously. There is no particular restriction on the type of first clutch 6. First clutch 6 may be a wet-type multiple disc clutch capable of changing the transmission torque capacity between engine 1 and motor-generator 5 by controlling its hydraulic fluid flow amount and pressure continuously with a proportional solenoid.

Second clutch 7 is disposed between motor-generator 5 and automatic transmission 3 (more specifically, between transmission shaft 4 and transmission input shaft 3a) and selectively engaged and disengaged to change a transmission torque capacity between motor-generator 5 and automatic transmission 3, and by extension between motor-generator 5 and driving wheels 2 continuously. There is no particular restriction on the type of second clutch 7. Second clutch 7 may also be a wet-type multiple disc clutch capable of changing the transmission torque capacity between motor-generator 5 and driving wheels 2 by controlling its hydraulic fluid flow amount and pressure continuously with a proportional solenoid.

With the above structure, the power train provides two drive modes: an electric drive (EV) mode in which the vehicle is powered by motor-generator 5 with engine 1 stopped and a hybrid drive (HEV) mode in which the vehicle is powered by both of engine 1 and motor-generator 5.

The EV mode is established for low-load, low-speed vehicle driving e.g. where the vehicle starts from a standstill. Upon selection of the EV mode, first clutch 6 is disengaged and second clutch 7 is engaged. Further, automatic transmission 3 is placed in a power transmission state. When motor-generator 5 is actuated in this state, automatic transmission 3 receives and transmits only torque Tm of motor-generator 5 to rear wheels 2 through differential gear unit 8 for vehicle electric driving.

The HEV mode is established for high-load, high-speed vehicle traveling. Both of first and second clutches 6 and 7 are engaged and automatic transmission 3 is placed in the power transmission state upon selection of the HEV mode. When motor-generator 5 is actuated in this state, automatic transmission 3 receives and transmits both of torque Te of engine 1 and torque Tm of motor-generator 5 to rear wheels 2 through differential gear unit 8 for vehicle hybrid driving. During the HEV mode, there may be excess energy when engine 1 is operated at optimum fuel consumption. In such a case, motor-generator 5 performs its generator function to convert the excess energy into electrical power. The electrical power is stored and used to operate motor-generator 5 as the motor and thereby improve the fuel consumption of engine 1.

The hybrid vehicle may alternatively employ another power train in which second clutch 7 is disposed between automatic transmission 3 and differential gear unit 8 as shown in FIG. 2. Even in such a power train arrangement, second clutch 7 is capable of changing the transmission torque capacity between motor-generator 5 and driving wheels 2 continuously in the same way as above.

The hybrid vehicle may employ still another power train in which one of the friction elements of automatic transmission 3, such as a start clutch, for selecting a forward or reverse gear is also used as second clutch 7 as shown in FIG. 3. This makes it possible to not only change the transmission torque capacity between motor-generator 5 and driving wheels 2 but also place automatic transmission 3 in the power transmission state by engagement of second clutch 7 so that the power train has great cost advantages without the need for exclusive second clutch 7.

As shown in FIG. 4, the hybrid vehicle further includes battery 9 to store therein the electrical power generated by motor-generator 5, inverter 10 to control energization of motor-generator 5 and a power train control apparatus to control the operations of the power train. The power train control apparatus has integrated controller 20, engine controller 21, motor-generator controller 22 and various detection units such as engine rotation sensor 11 to detect a rotational speed Ne of engine 1, motor-generator rotation sensor 12 to detect a rotational speed Nm of motor-generator 5, transmission input rotation sensor 13 to detect a rotational speed Ni of transmission input shaft 3a, transmission output rotation sensor 14 to detect a Rotational speed No of transmission output shaft 3b, accelerator opening sensor 15 to detect an accelerator opening APO as an accelerator pedal depression amount indicating a requested load of engine 1 and storage state sensor 16 to detect a state of charge SOC of battery 9 (or an amount of electrical power that can be taken out of battery 9).

Integrated controller 20 receives the detection signals from sensors 11 to 16 and performs integration control of operation points of the power train based on the detection signals. The operation points of the power train are herein defined by a target torque tTe of engine 1, a target torque tTm of motor-generator 5 (or a target rotational speed tNm of motor-generator 5), a target transmission torque capacity tTc1 of first clutch 6 and a target transmission torque capacity tTc2 of second clutch 7. More specifically, integrated controller 20 makes a selection between the EV mode and the HEV mode according to the accelerator opening APO, the battery charge state SOC and the transmission output rotational speed No (vehicle speed VSP) so as to achieve a vehicle driving force according to a driver's request. Integrated controller 20 also calculates the target engine torque tTe, the target motor-generator torque tTm (target motor-generator rotational speed tNm), the target first clutch transmission torque capacity tTc1 and the target second clutch transmission torque capacity tTc2 according to the accelerator opening APO, the battery charge state SOC and the transmission output rotational speed No (vehicle speed VSP). The target engine torque tTe is outputted to engine controller 21 so that engine controller 21 controls engine 1 in such a manner as to adjust the actual engine torque Te to the target engine torque tTe. Further, the target motor-generator torque tTm (target motor-generator rotational speed tNm) is outputted to motor-generator controller 22 so that motor-generator controller 22 controls motor-generator 5 through battery 9 and inverter 10 in such a manner as to adjust the actual motor-generator torque Tm (motor-generator rotational speed Nm) to the target motor-generator torque tTm (motor-generator rotational speed tNm). Integrated controller 20 further supplies electric currents to hydraulic control solenoids of first and second clutches 6 and 7 in such a manner as to adjust the actual torque transmission capacities Tc1 and Tc2 to the target torque transmission capacities tTc1 and tTc2, respectively, for individual clutch engagement control.

In the present embodiment, integrated controller 20 executes a motor lock prevention program during the EV mode in order to prevent motor-generator 5 from being locked to cause a decrease in output torque by heat generation even under load operating conditions. Accordingly, integrated controller 20 acts as a motor lock prevention control device, together with the other controllers 21 and 22 and detection units 11 to 16 in the present embodiment.

Figure 5:
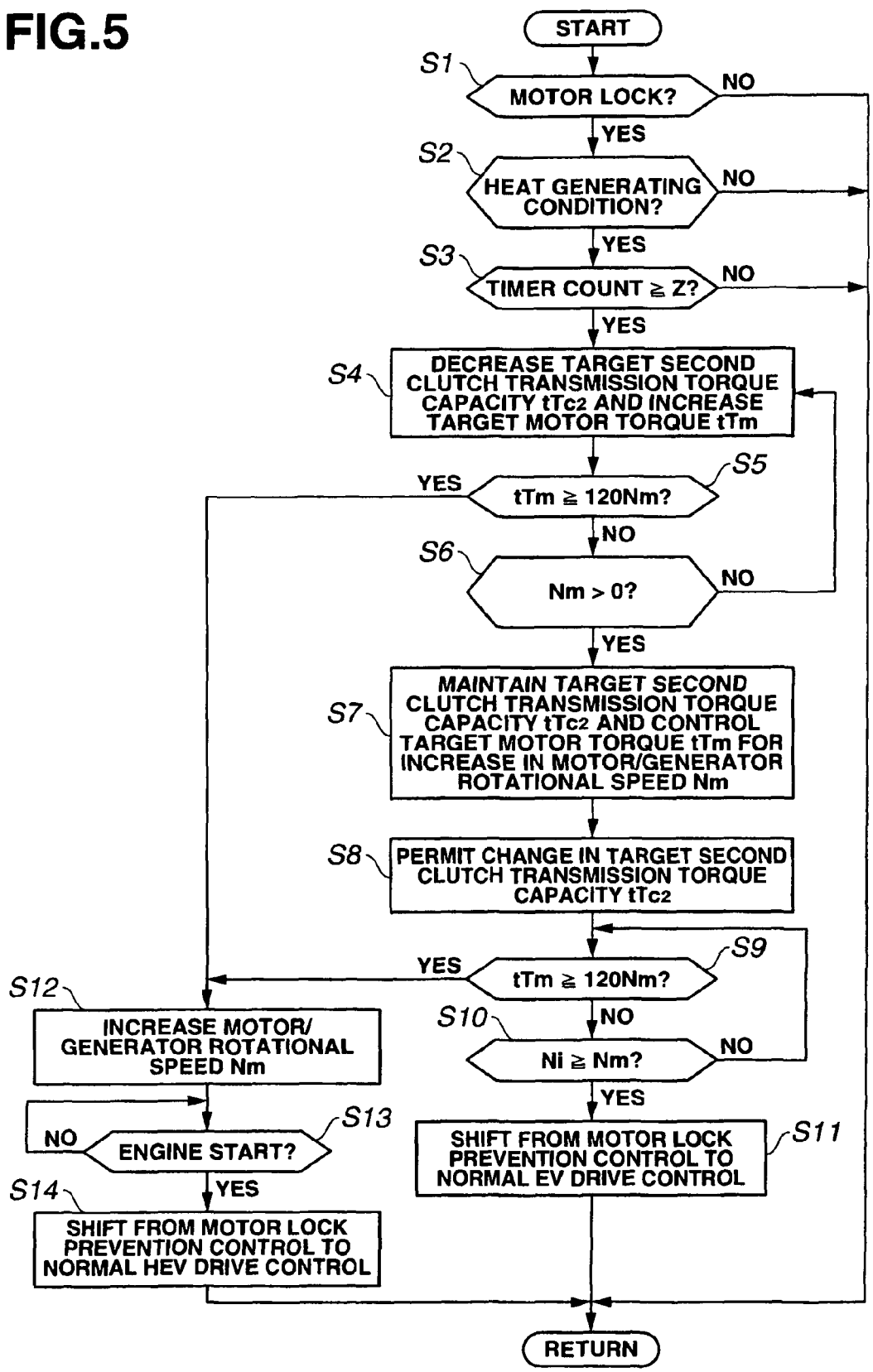
FIG. 5 is a flow chart for a motor lock prevention program run on the power train control apparatus of the hybrid vehicle according to one embodiment of the present invention.

The motor lock prevention program is run through the following steps as shown in FIG. 5.

In step S1, integrated controller 20 judges whether motor-generator 5 is in a motor locked state where motor-generator 5 is locked and cannot rotate properly even under load operating conditions. When motor-generator 5 is judged as being in the motor locked state (Yes in step S1), the program control proceeds to step S2. When motor-generator 5 is not judged as being in the motor locked state (No in step S1), the program control exits from the motor lock prevention program and returns to the main program.

In step S2, integrated controller 20 judges whether motor-generator 5 satisfies a heat generating condition where inverter 10 sets up continuous motor-generator energization in its specific phase to cause a temperature increase of motor-generator 5 by heat generation during the motor locked state. When the motor-lock heat generating condition is satisfied (Yes in step S2), the program control proceeds to step S3. When the motor-lock heat generating condition is not satisfied (No in step S2), the program control exits from the motor lock prevention program and returns to the main program.

Figure 6:
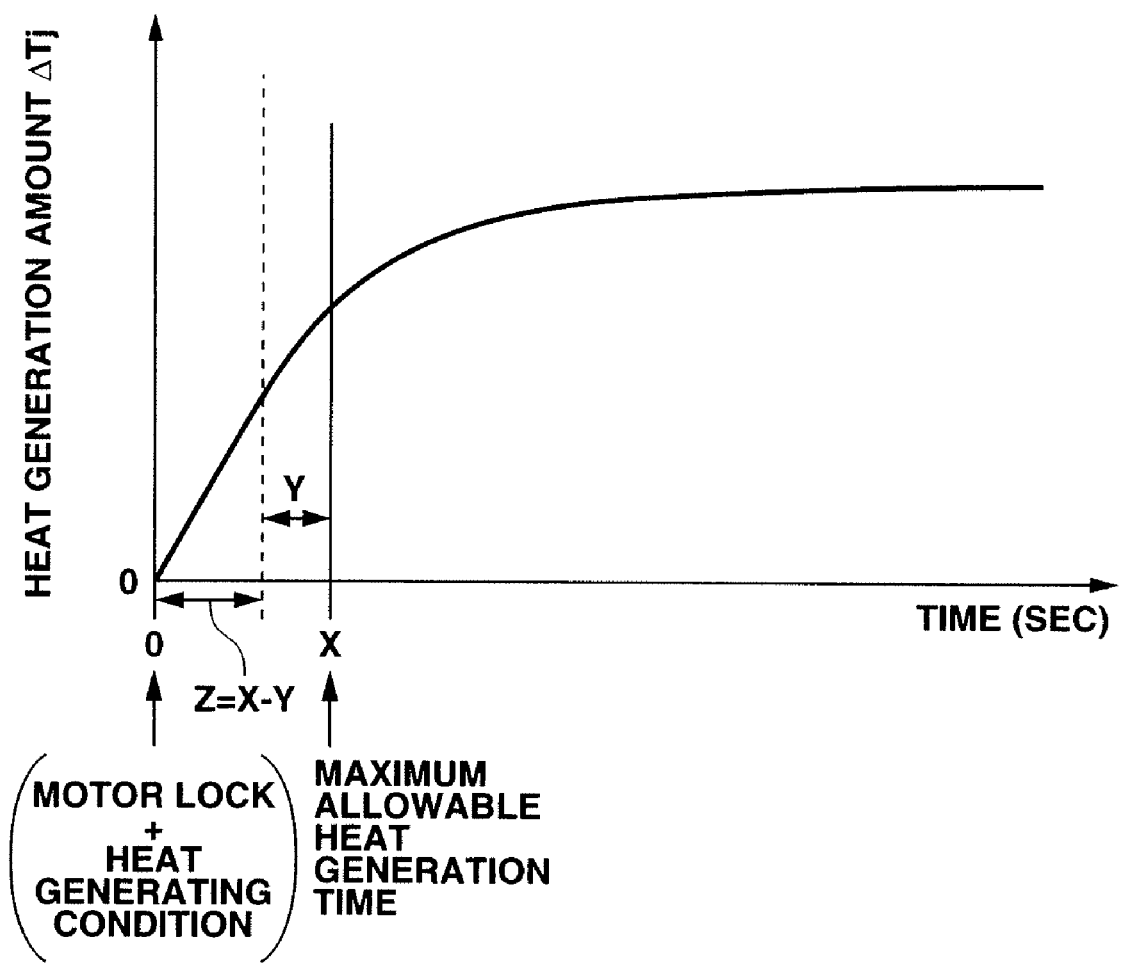
FIG. 6 is a graph showing motor-generator heat generation characteristics of the hybrid vehicle.

In step S3, integrated controller 20 judges whether a motor lock prevention control time Z has elapsed from the satisfaction of the motor-lock heat generating condition. When the motor lock prevention control time Z has elapsed after the satisfaction of the motor-lock heat generating condition (Yes in step S3), the program control proceeds to step S4 in order to initiate the following time-series motor lock prevention control. When the motor lock prevention control time Z has not yet elapsed after the satisfaction of the motor-lock heat generating condition (No in step S3), the program control exits from the motor lock prevention program and returns to the main program. As shown in FIG. 6, motor-generator 5 (inverter 10) generally shows heat generation characteristics that the amount of heat $\Delta Tj$ generated by motor-generator 5 (inverter 10) gradually increases with time during the motor locked state. A time X during which the heat generation amount $\Delta Tj$ reaches a maximum allowable level (hereinafter referred to as "maximum allowable heat generation time") is calculated from the above heat generation characteristics. Assuming that there is a control response delay Y until motor-generator 5 becomes released from the motor locked state to accomplish rotation of motor-generator 5 under the motor lock prevention control, the motor lock prevention control time is determined as $Z=X-Y$ in the present embodiment. In view of the safety margin, the motor lock prevention control time Z may be set slightly shorter than X–Y By setting the motor lock prevention control time Z as a sufficient time to accomplish the rotation of motor-generator 5 in advance of the timing at which the heat generation amount $\Delta Tj$ reaches the maximum allowable level based on the motor-generator (inverter) heat generating characteristics, and then, initiating the motor lock prevention control at the time the motor lock prevention control time Z has elapsed after the satisfaction of the motor-lock heat generating condition, the rotation of motor-generator 5 can be ensured assuredly for motor lock prevention before the heat generation amount $\Delta Tj$ reaches the maximum allowable level.

In step S4, integrated controller 20 adjusts either one of the target second clutch transmission torque capacity tTc2 and the target motor-generator torque tTm in such a manner that the target motor-generator torque tTm exceeds the target second clutch transmission torque capacity tTc2 so as to rotate motor-generator 5 forcibly for motor lock prevention. In the present embodiment, integrated controller 20 gradually decreases the target second clutch transmission torque capacity tTc2 and increases the target motor-generator torque tTm on the time series. As the maximum motor torque capacity of 270 Nm is divided between 150 Nm of torque for starting engine 1 and 120 Nm of torque for driving the hybrid vehicle in the present embodiment, the target second clutch transmission torque capacity tTc2 is gradually decreased from 120 Nm in this step.

In step S5, integrated controller 20 judges whether the target motor-generator torque tTm is higher than or equal to the EV drive torque (120 Nm as mentioned above in the present embodiment) to determine whether motor-generator 5 is producing a sufficiently high torque to start engine 1. When tTm<120 Nm (No in step S5), the program control proceeds to step S6. When tTm≧120 Nm (Yes in step S5), the program control proceeds to step S12.

In step S6, integrated controller 20 judges whether the target motor-generator torque tTm exceeds the target second clutch transmission torque capacity tTc2 by the decrease of the target second clutch transmission torque capacity tTc2 and by the increase of the target motor-generator torque tTm so that motor-generator 5 starts rotating with a slip of second clutch 7 (i.e. whether the motor-generator rotational speed Nm becomes higher than zero). When Nm=0 (No in step S6), the program control returns to step S4 and repeats steps S4 to S6. When Nm>0 (Yes in step S6), the program control proceeds to step S7.

In step S7, integrated controller 20 maintains the target second clutch transmission torque capacity tTc2 at its current value A but further increases the target motor-generator torque tTm in such a manner that the motor-generator rotational speed Nm reaches a level corresponding to a motor unlocked state where motor-generator 5 is unlocked and can rotate freely. By increasing the motor-generator torque tTm to such a target motor unlock rotational speed, the rotation of motor-generator 5 can be ensured more assuredly for motor lock prevention.

In step S8, integrated controller 20 permits the target second clutch transmission torque capacity tTc2 to be changed.

In step S9, integrated controller 20 judges whether the target motor-generator torque tTm is higher than or equal to the EV drive torque (120 Nm in the present embodiment) to determine whether motor-generator 5 is producing a sufficiently high torque to start engine 1 in the same way as in step S5. When tTm<120 Nm (No instep S9), the program control proceeds to step S1. When tTm≧120 Nm (Yes in step S9), the program control proceeds to step S12.

In step S10, integrated controller 20 judges whether the transmission input rotational speed Ni (the transmission side rotational speed of second clutch 7) is higher than or equal to the motor-generator rotational speed Nm (the motor-generator side rotational speed of second clutch 7) to determine whether there occurs no slip of second clutch 7. When Ni≧Nm (Yes in step 510), the program control proceeds to step 511. When Ni<Nm (No in step S10), the program control retrns to step S9.

In step S11, integrated controller 20 shifts from the motor lock prevention control to the normal EV drive control and increases the target second clutch transmission torque capacity tTc2 and the target motor-generator torque tTm to achieve a desired vehicle driving force.

In step S12, integrated controller 20 generates an engine start request to increase the motor-generator rotational speed Nm to an engine startable level (e.g. 1000 rpm) or higher, engage first clutch 6 and cause ignition at the time the engine rotational speed Ne reaches the engine starting speed. At this time, second clutch 7 is kept in a slip state in order to prevent driving wheels 2 from becoming affected by torque fluctuations before the start of engine 1. By starting engine 1 as required under the motor lock prevention control, motor-generator 5 can be prevented from the motor locked state more assuredly.

In step S13, integrated controller 20 judges whether engine 1 has been started in response to the engine start request and moves second clutch 7 into engagement upon judging that engine 1 has been started in response to the engine start request.

In step S14, integrated controller 20 shifts from the motor lock prevention control to the normal HEV drive control and controls the target second clutch transmission torque capacity tTc2 and the target motor-generator torque tTm to achieve a desired vehicle driving force.

Figure 7:
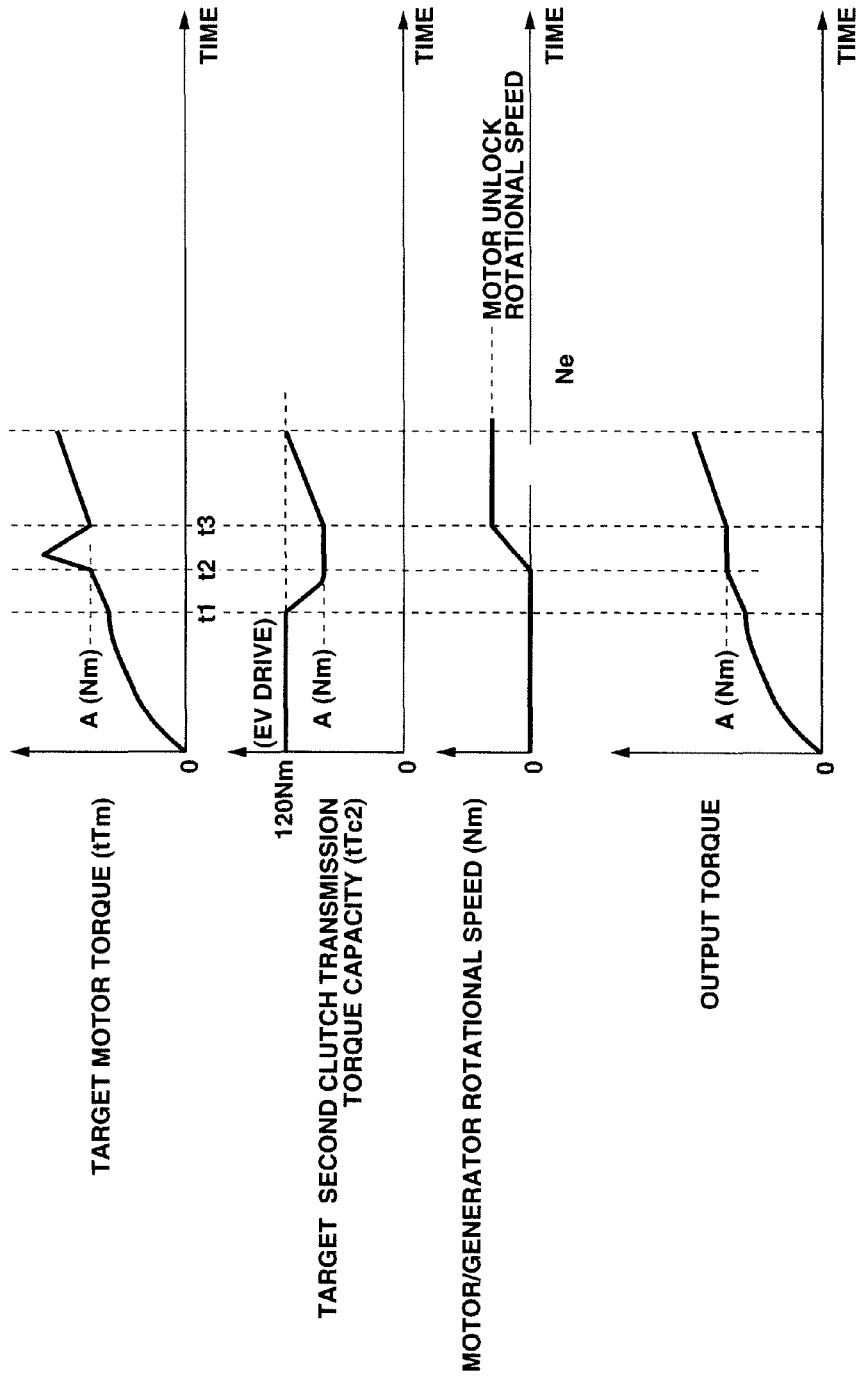
FIG. 7 is a time chart showing one example of motor lock prevention control during the execution of the motor lock prevention control program.

The above motor lock prevention control is effected as shown in FIGS. 7 and 9.

At time t1, the motor lock prevention control is initiated at the time the motor lock prevention control time Z has elapsed after the satisfaction of the motor-lock heat generating condition.

Between time t1 and t2, the target second clutch transmission torque capacity tTc2 is gradually decreased from 120 Nm (EV drive torque) under the motor lock prevention control. On the other hand, the target motor-generator torque tTm is gradually increased between time t1 and t2 under the motor lock prevention control.

At time t2, the target motor-generator torque tTm exceeds the target second clutch transmission torque capacity tTc2 under the motor lock prevention control. Then, motor-generator 5 starts rotating to make an increase in motor-generator rotational speed Nm.

Between time t2 and t3, the target motor-generator torque tTm is further increased to the target motor unlock rotational speed whereas the target second clutch transmission torque capacity tTc2 is maintained at the torque capacity A.

At time t3, the motor lock prevention control is finished when the motor-generator rotational speed Nm reaches the motor unlock rotational speed. After that, both of the target second clutch transmission torque capacity tTc2 and the target motor-generator torque tTm are increased to achieve a desired vehicle driving force under the normal EV drive control.

It is now assumed that, at time t4, the target motor-generator torque tTm becomes higher than or equal to 120 Nm (EV drive torque) as shown in FIG. 9 so that motor-generator 5 produces a sufficient torque to start engine 1 under the motor lock prevention control.

Between times t4 and t5, the motor-generator rotational speed NTm is then further increased to 1000 rpm (engine startable speed) under the motor lock prevention control. On the other hand, the target second clutch transmission torque capacity tTc2 is maintained at its current value between times t4 and t5.

At time t5, the motor lock prevention control is finished when engine 1 is started upon ignition and engagement of first clutch 6. After that, both of the target second clutch transmission torque capacity tTc2 and the target motor-generator torque tTm are adjusted in step S14 to achieve a desired vehicle driving force under the normal HEV drive control.

In this way, the motor lock prevention control is performed upon satisfaction of the motor-lock heat generating condition so as to induce rotation of motor-generator 5 by adjusting at least one of the output torque Tm of motor-generator 5 and the transmission torque capacity tTc2 of the second clutch in such a manner that the motor-generator torque Tm exceeds the second clutch transmission torque capacity Tc2. It is therefore possible to obtain a motor lock prevention effect on the hybrid vehicle, in which a single motor-generator 5 is mounted for use in electric vehicle driving and engine starting, so as to take proper and effective measures against the heat generation caused by motor-generator 5 (inverter 10) due to the motor locked state.

In the case where the target second clutch transmission torque capacity tTc2 and the target motor-generator torque tTm take values B and C, respectively, such that the difference between these values B and C is larger than or equal to a given degree at time t1 at the time the motor lock prevention control time Z has elapsed after the satisfaction of the motor-lock heat generating condition, the target second clutch transmission torque capacity tTc2 can be decreased to a certain level e.g. tTm+10 Nm in an instant and then gradually controlled on the time series as shown in FIG. 8. This allows the rotation of motor-generator 5 to be accomplished quickly for motor lock prevention.

The entire contents of Japanese Patent Application No. 2006-185565 (filed on Jul. 5, 2006) are herein incorporated by reference.

Although the present invention has been described with reference to the above-specific embodiments of the invention, the invention is not limited to the these exemplary embodiments. Various modification and variation of the embodiments described above will occur to those skilled in the art in light of the above teachings. The scope of the invention is defined with reference to the following claims.

What is claimed is:

1. A motor lock prevention control device for a hybrid electric vehicle, the hybrid electric vehicle having an engine and a motor-generator as a driving power source, driving wheels and a start clutch, the motor-generator being connected to the engine and the driving wheels via shafts, respectively, to output a torque of the motor-generator to the engine and to the driving wheels, the start clutch being disposed between the motor-generator and the driving wheels to change a transmission torque capacity of the start clutch between the motor-generator and the driving wheels, the hybrid electric vehicle being placed into an electric drive mode in which the vehicle is powered by the motor-generator with the engine stopped or a hybrid drive mode in which the vehicle is powered by the engine and the motor-generator upon engagement of the start clutch, the motor lock prevention control device being configured to:

judge whether the motor-generator is being energized in such a manner as to cause heat generation in a motor locked state under a drive load operating condition;

when the motor-generator is judged as being energized in such a manner as to cause heat generation in the motor locked state under the drive load operating condition, perform motor lock prevention control to induce rotation of the motor-generator by adjusting at least one of the transmission torque capacity of the start clutch and the torque of the motor-generator such that the torque of the motor-generator exceeds the transmission torque capacity of the start clutch; and after inducing said rotation of the motor-generator, while maintaining the transmission torque capacity of the start clutch at a given value, increase the torque of the motor-generator such that a rotational speed of the motor-generator reaches a level corresponding to a motor unlocked state of the motor-generator.

2. A motor lock prevention control device according to claim 1, wherein the motor lock prevention control device is configured to initiate the motor lock prevention control at a sufficient time to accomplish said rotation of the motor-generator before the heat generation reaches a maximum allowable level.

3. A motor lock prevention control device according to claim 1, wherein the motor lock prevention control device is configured to induce said rotation of the motor-generator by gradually decreasing the transmission torque capacity of the start clutch in a time series.

4. A motor lock prevention control device according to claim 1, wherein the motor lock prevention control device is configured to induce said rotation of the motor-generator by decreasing the transmission torque capacity of the start clutch to a certain level in an instant and then gradually decreasing the transmission torque capacity of the start clutch in a time series when a difference between the transmission torque capacity of the start clutch and the torque of the motor-generator is larger than or equal to a given degree.

5. A motor lock prevention control device according to claim 1, wherein the hybrid electric vehicle has another clutch provided separately from the start clutch and disposed between the engine and the motor-generator to change a transmission torque capacity between the engine and the motor-generator; and wherein the motor lock prevention control device is configured to start the engine upon engagement of said another clutch provided separately from the start clutch and disposed between the engine and the motor-generator when the torque of the motor-generator becomes sufficiently high to start the engine.

6. A motor lock prevention control device according to claim 1, wherein the hybrid electric vehicle has a motor-generator energization control circuit configured to control energization of the motor-generator such that said heat generation is caused by continuous energization of the motor-generator in a specific phase of the motor-generator energization control circuit.

7. A motor lock prevention control method for a hybrid electric vehicle, the hybrid electric vehicle having an engine, a motor-generator as a driving power source, driving wheels and a start clutch, the motor-generator being connected to the engine and the driving wheels via shafts, respectively, to output a torque of the motor-generator to the engine and to the driving wheels, the start clutch being disposed between the motor-generator and the driving wheels to change a transmission torque capacity of the start clutch between the motor-generator and the driving wheels, the motor lock prevention control method comprising:

judging whether the motor-generator is being energized in such a manner as to cause heat generation in a motor locked state under a drive load operating condition;

when the motor-generator is judged as being energized in such a manner as to cause heat generation in the motor locked state under the drive load operating condition, performing motor lock prevention control to induce rotation of the motor-generator by adjusting at least one of the transmission torque capacity of the start clutch and the torque of the motor-generator such that the torque of the motor-generator exceeds the transmission torque capacity of the start clutch; and after inducing said rotation of the motor-generator, increasing the torque of the motor-generator such that a rotational speed of the motor-generator reaches a level corresponding to a motor unlocked state of the motor-generator while maintaining the transmission torque capacity of the start clutch at a given value.

* * * * *